United States Patent [19]

Tsuchida

[11] Patent Number: 5,067,125
[45] Date of Patent: Nov. 19, 1991

[54] TELEPHONE SYSTEM FOR ISDN AND PUBLIC TELEPHONE NETWORKS

[75] Inventor: Shinji Tsuchida, Zama, Japan
[73] Assignee: Canon Kabushiki Kaisha, Tokyo, Japan
[21] Appl. No.: 396,651
[22] Filed: Aug. 22, 1989
[30] Foreign Application Priority Data Aug. 25, 1988 [JP] Japan ................... 63-209455

[51] Int. Cl.⁵ .............................. H04J 3/02
[52] U.S. Cl. .................... 370/79; 370/110.1; 370/60
[58] Field of Search ............... 370/79, 110.1, 60, 58.1

[56] References Cited

U.S. PATENT DOCUMENTS 4,453,247  6/1984  Suzuki et al. ............... 370/60
4,644,527  2/1987  Anderson et al. ............ 370/110.1
4,771,425  9/1988  Baren et al. ............... 370/110.1
4,922,484  5/1990  Yoshida et al. ............. 370/110.1

FOREIGN PATENT DOCUMENTS 2159367  11/1985  United Kingdom .

Primary Examiner—Douglas W. Olms
Assistant Examiner—Min Jung
Attorney, Agent, or Firm—Fitzpatrick, Cella, Harper & Scinto

[57] ABSTRACT

A telephone system which can be connected to both an ISDN and a public telephone network. When an analog telephone communicates with the ISDN, digital communication information from the ISDN is converted into the corresponding analog communication information by a A/D conversion circuit so as to transmit it to the analog telephone. Analog communication information from the analog telephone is converted into the corresponding digital communication information by an A/D conversion circuit so as to transmit it to the ISDN. Therefore, usual analog telephones can be connected to the ISDN. When the digital telephone communicates with a public telephone network, analog communication from the public telephone network is converted into the corresponding digital communication information by the A/D conversion circuit so as to transmit it to the digital telephone, while digital communication information from the digital telephone is converted into the corresponding analog communication information by the D/A conversion circuit so as to transmit it to the public telephone network. Therefore, digital telephones can be connected to a usual public telephone network.

16 Claims, 10 Drawing Sheets

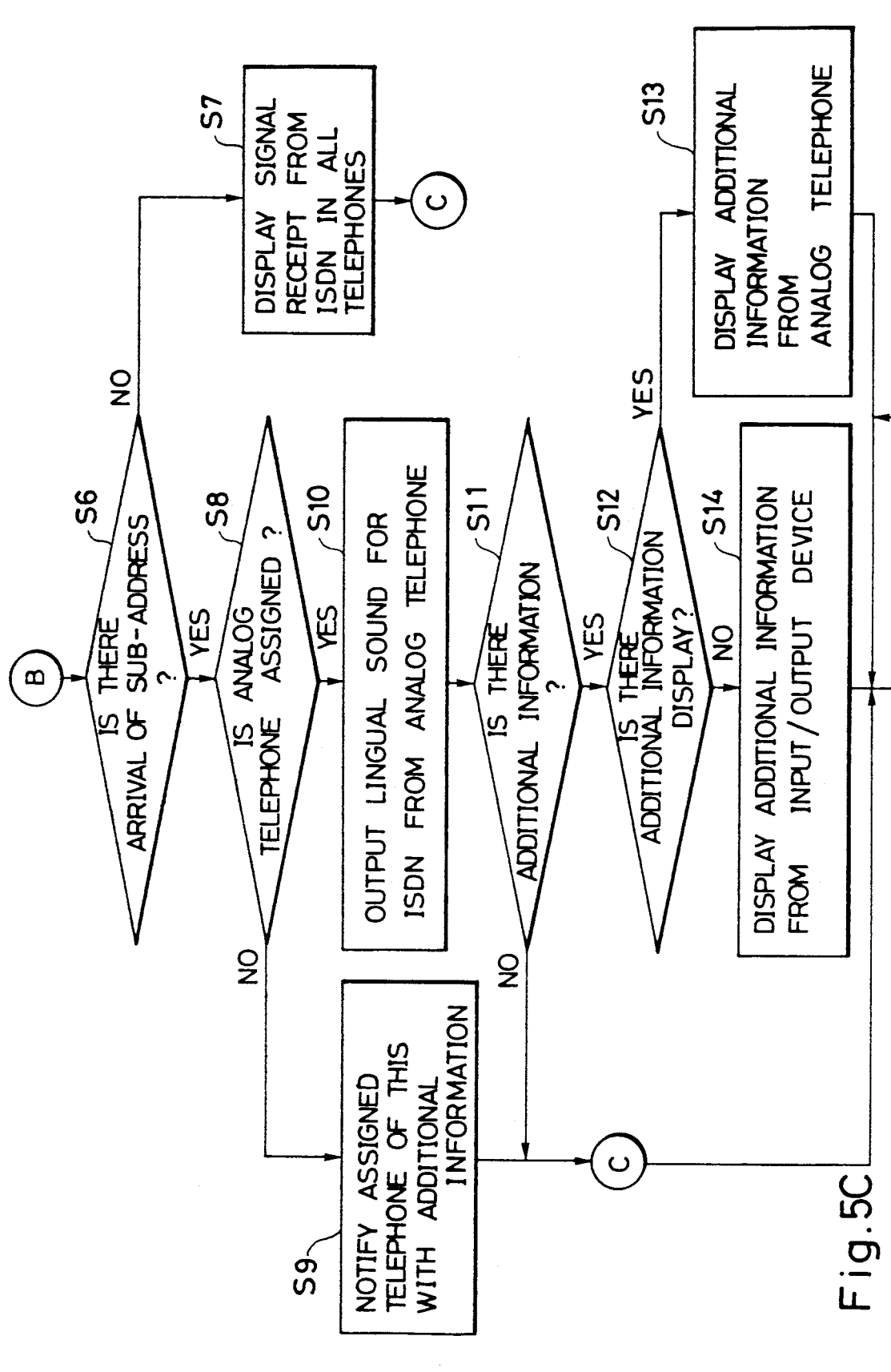

TELEPHONE SYSTEM FOR ISDN AND PUBLIC TELEPHONE NETWORKS

BACKGROUND OF THE INVENTION

1. Field of the Invention

The present invention relates to a telephone system capable of being connected to an ISDN or both the ISDN and the public telephone network.

2. Description of the Related Art

In accordance with the development of the digital processing technology and communication technology, a demand of establishment of a direct connection by means of a digital communication between information processing units which are positioned away from each other has been arisen. As a communication network capable of performing such a digital communication, an ISDN has been developed.

However, since all of communication information is arranged to be transmitted in the form of a digital communication information, the widely-used analog signal I/O terminals (to be called "an SLT" hereinafter) such as usual telephones for the public telephone network cannot be connected to the digital ISDN to receive data.

SUMMARY OF THE INVENTION

An object of the present invention is to provide a telephone system capable of overcoming the above-described problems and capable of being connected to an ISDN or both the ISDN and a public telephone network. In order to achieve the above described object, the first aspect of the present invention lies in a telephone system connected to at least an ISDN and capable of accommodating an extension line connected to an analog signal I/O terminal and an extension line connected to a digital signal I/O terminal, the telephone system comprises:

D/A conversion means capable of converting digital communication information into a corresponding analog communication information;

A/D conversion means capable of converting analog communication information into a corresponding digital communication information; and communication line control means capable of controlling a communication line arranged between a line connected to the ISDN and the accommodated extension lines.

Furthermore, this telephone system further comprises notifying means for notifying a caller of a fact that the call is responded by the analog signal I/O terminal and also notifying the analog signal I/O terminal which is responding to the call of a fact that the subject call is made by the ISDN when a call receipt demand from the ISDN is responded by the analog signal I/O terminal.

The telephone system further comprises collection means for collecting a communication history and storage means for storing the communication history collected by the collection means.

The telephone system further comprises means for at least outputting a demand of a call receipt to a connected extension line which is specified by additional service information obtainable from the ISDN when a demand of a call receipt is further made by the ISDN.

Another aspect of the invention lies in a telephone system connected to a public telephone network and an ISDN and capable of accommodating an extension line connected to an analog signal I/O terminal and an extension line connected to a digital signal I/O terminal, the telephone system comprises:

D/A conversion means capable of converting digital communication information into a corresponding analog communication information;

A/D conversion means capable of converting analog communication information into a corresponding digital communication information; and communication line control means capable of controlling a communication line arranged between a line connected to the ISDN and the accommodated extension lines.

The telephone system further comprises charging means for performing a predetermined charging processing when a call from the public telephone network is responded.

A telephone system connected to a public telephone network and an ISDN and capable of accommodating an extension line connected to an analog signal I/O terminal and an extension line connected to a digital signal I/O terminal, the telephone system comprises:

D/A conversion means capable of converting digital communication information into a corresponding analog communication information;

A/D conversion means capable of converting analog communication information into a corresponding digital communication information; and communication line control means capable of controlling a communication line arranged between a line connected to the ISDN and the accommodated extension lines.

As a result of the structure established as described above, a call made from the public telephone network or ISDN can be responded by both the analog signal I/O terminal and the digital signal I/O terminal which are connected to the extension lines.

As a result, since the conventional analog signal I/O terminals can be connected, the resource can be efficiently utilized and the additional service obtainable from the ISDN can be sufficiently utilized.

BRIEF DESCRIPTION OF THE DRAWINGS

FIGS. 5A to 5F are flow charts which illustrate conversation control processings according to this embodiment.

DESCRIPTION OF THE PREFERRED EMBODIMENTS

Figure 1:
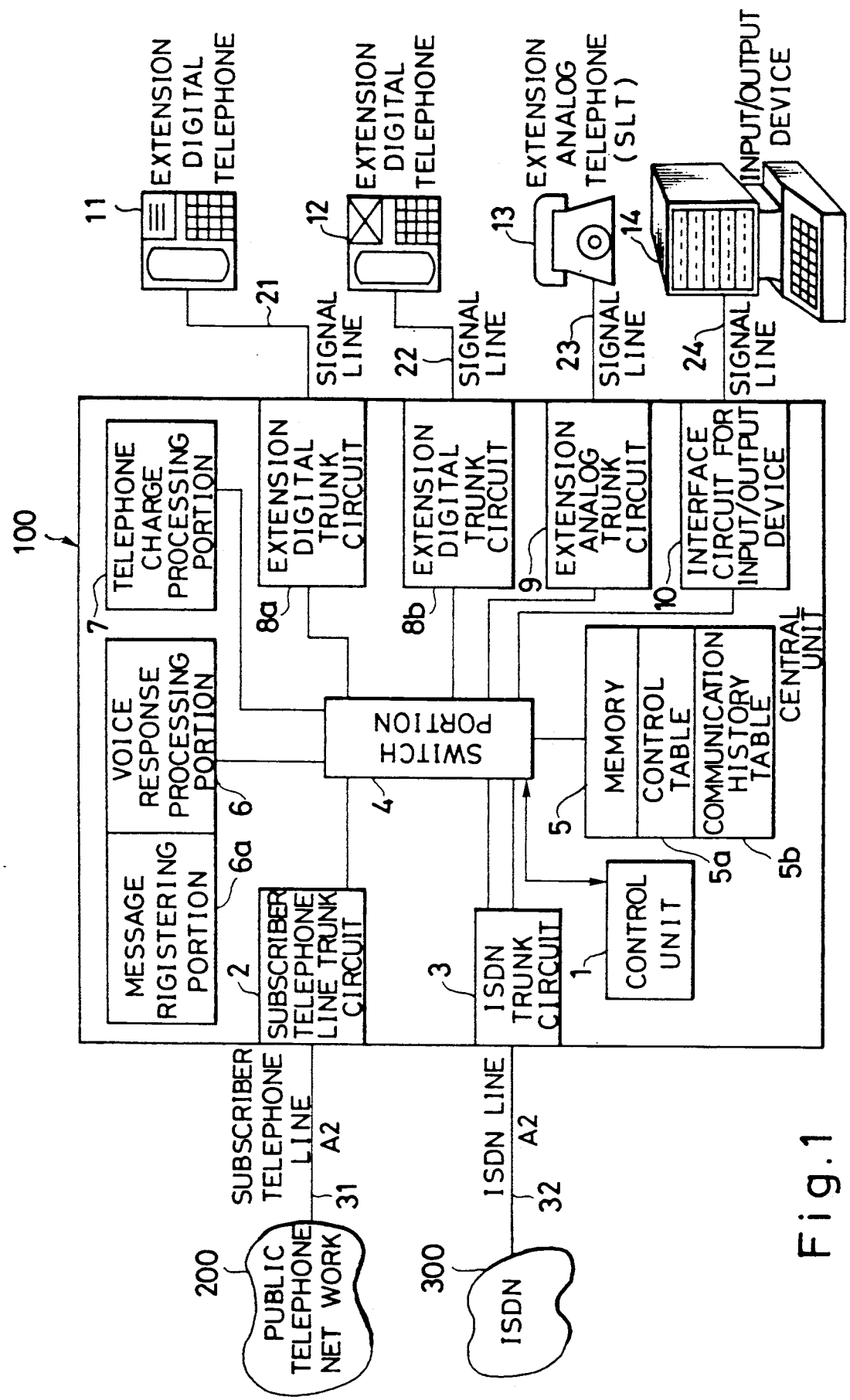
FIG. 1 is a block diagram according to an embodiment of the present invention.

An embodiment of the present invention will be described in detail with reference to the drawing.

(First embodiment)

FIG. 1 is a block diagram which illustrates the structure of an embodiment according to the present invention. Referring to this drawing, reference numerals 11 to 14 represent extension terminals connected to a main unit 100, 31 represents a connection line establishing a connection with a subscriber telephone line, 32 represents a connection line establishing a connection with an ISDN, 100 represents the main unit, 200 represents a public telephone network, and 300 represents the ISDN.

In the extension terminals, reference numerals 11 and 12 represent extension digital telephones connected to the main unit 100 with digital signal lines 21 and 22. Reference numeral 13 represents an extension analog telephone connected to the main unit 100 with an analog signal line 23. Reference numeral 14 represents an input/output device capable of inputting and outputting various information, this device being connected, with the digital signal line 24, to the main unit 100, provided with a display and a keyboard, and also having a function to serve as the system console according to this embodiment.

According to this embodiment, a case in which one subscriber telephone line and ISDN line and four extension lines 21 to 24 are respectively formed will be described in order to make the description simple. However, this embodiment is not limited to the above-described arrangement about the number of the lines.

Figure 5A:
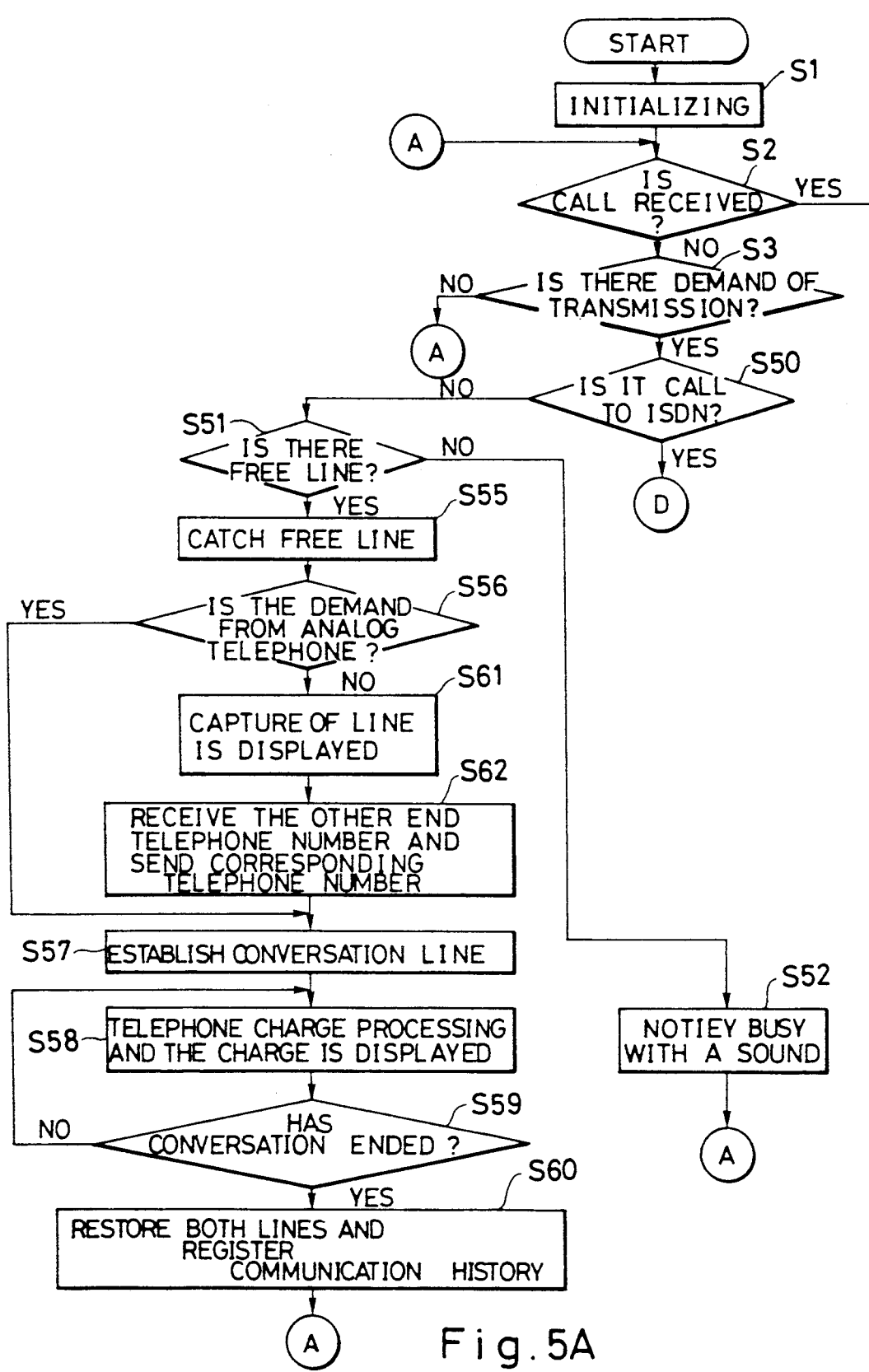
Figure 5B:
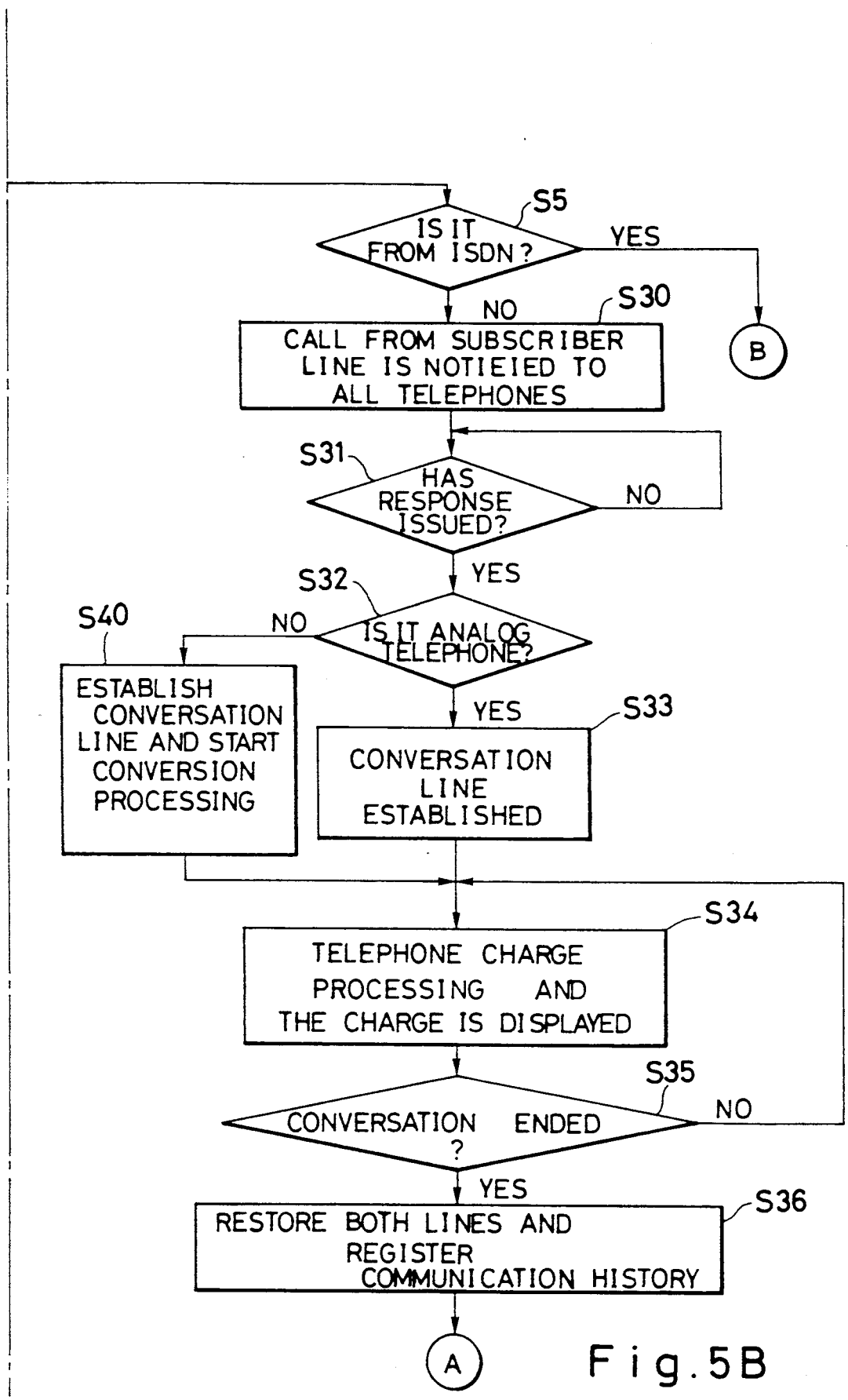
Figure 5D:
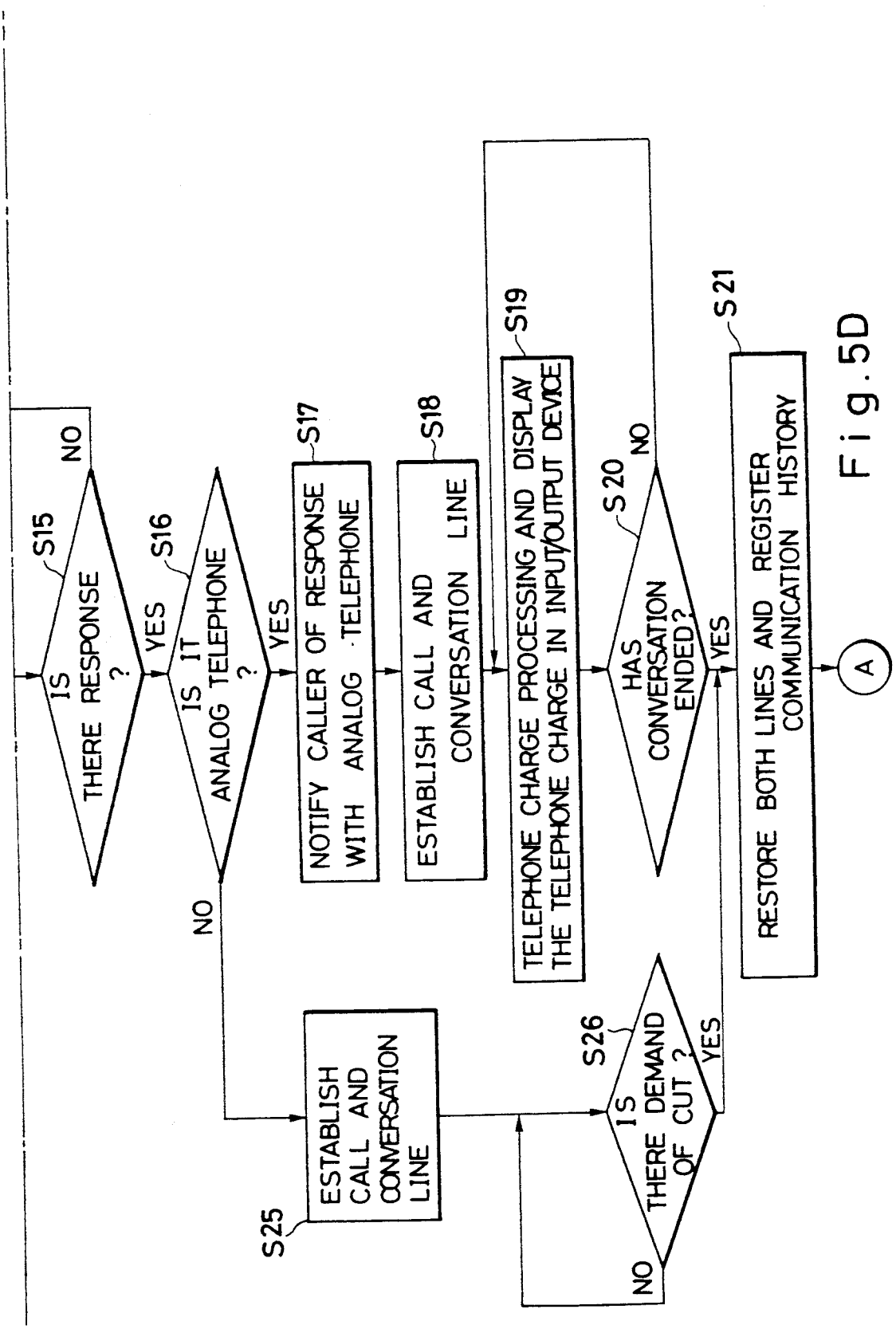
Figure 5E:
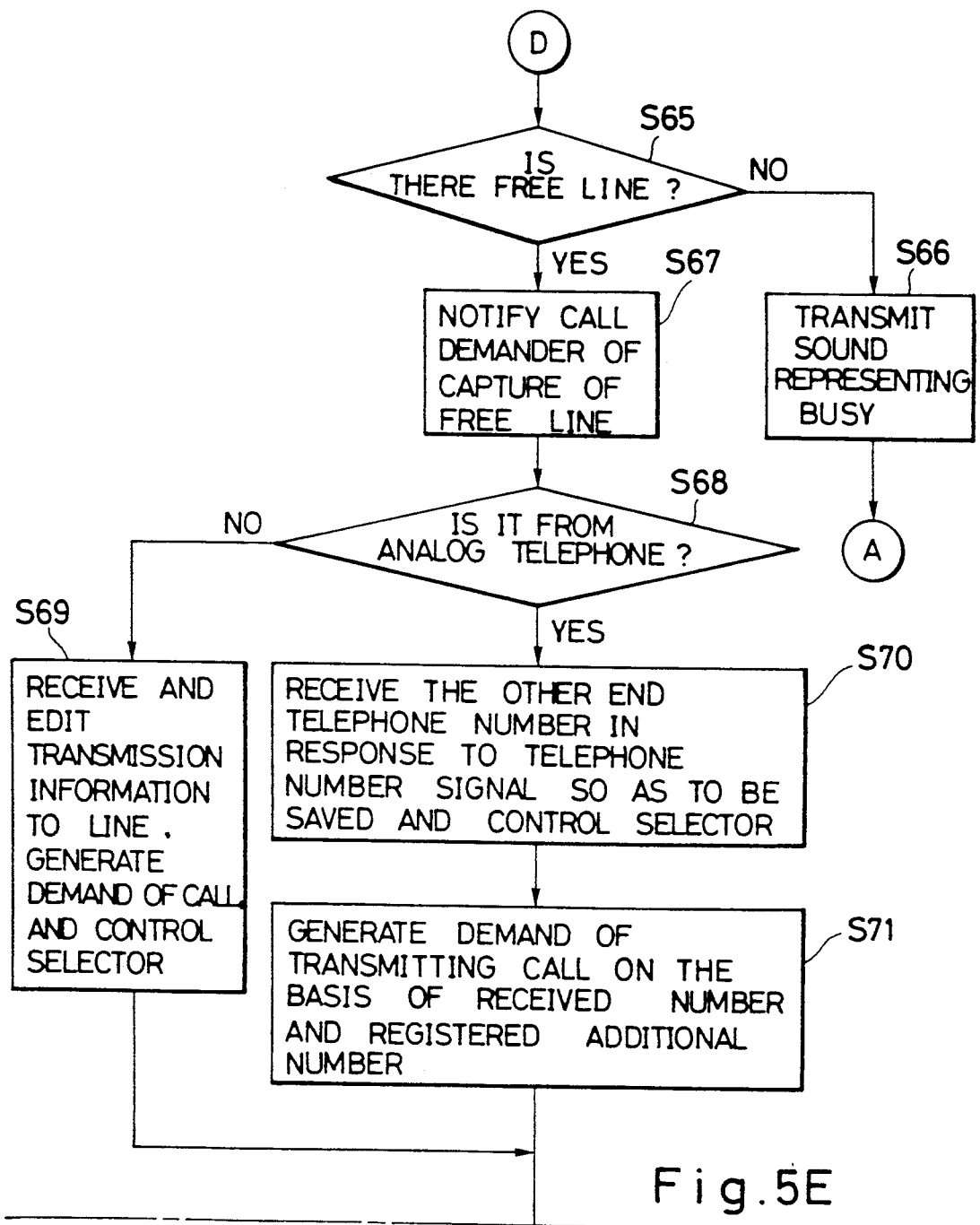
Figure 5F:
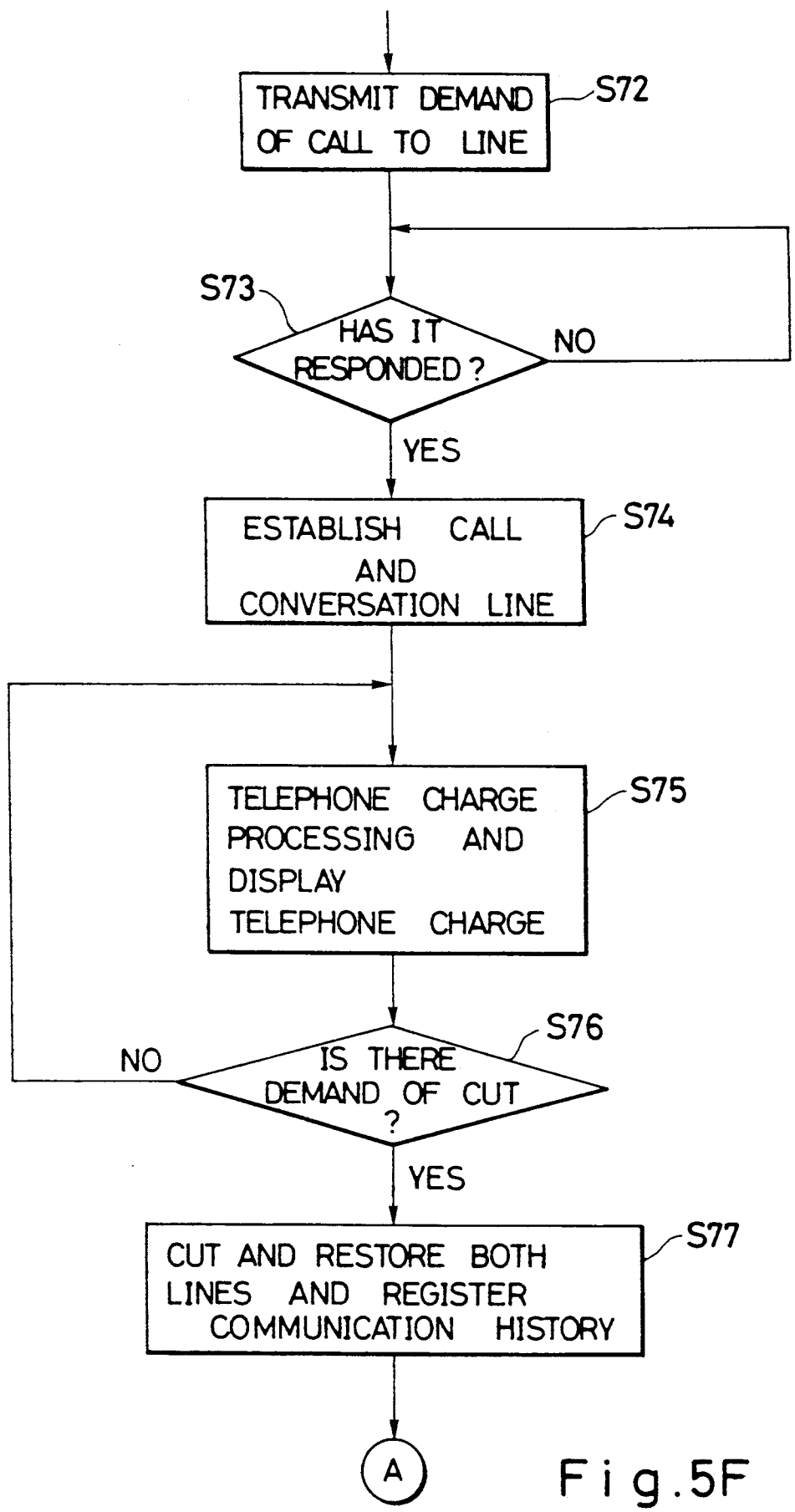

In the main unit 100, reference numeral 1 represents a control unit included in a memory 5 and capable of controlling the overall structure of this embodiment in accordance with programs shown in FIG. 5A to 5C, this control portion 1 being able to conduct a communication control in accordance with a known ISDN communication standard, and as well able to conduct the control of an establishment/an opening of the conversation line of the subscriber telephone line (public telephone line) in accordance with a regulated standard. Reference numeral 2 represents a subscriber telephone line trunk circuit serving as an interface with the subscriber telephone line 31. Reference numeral 3 represents an ISDN trunk circuit serving as an interface with the ISDN circuit, and 4 represents a switch processing portion for controlling the conversation line between the connection line for the subscriber telephone and the ISDN line 32. Reference numeral 5 represents a memory for temporarily storing the processing information according to this embodiment in addition to storing the above-described programs, which includes a control table 5a in which the attribute of each of the connected extension lines and the attribute of the extension telephone connected to these extension lines are stored and a conversation history table 5b in which a conversation history of each of the extension telephones for a certain time period is stored. Reference numeral 6 represents a voice response processing portion for making a message registering portion 6a included therein store digital voice signals which correspond to a variety of response analog voice information and reading and transmitting a desired response digital voice signal upon the control performed by the control unit 1. Reference numeral 7 represents a telephone charge processing portion for conducting the telephone charge processing when a call is made to the subscriber telephone line 31. Reference numerals 8a and 8b represent extension digital trunk circuits serving as interfaces with the extension digital telephones 11 and 12. Reference numeral 9 represents an extension analog circuit serving as an interface with the extension analog telephone 13. Reference numeral 10 represents an interface with the input/output device 14.

Figure 2:
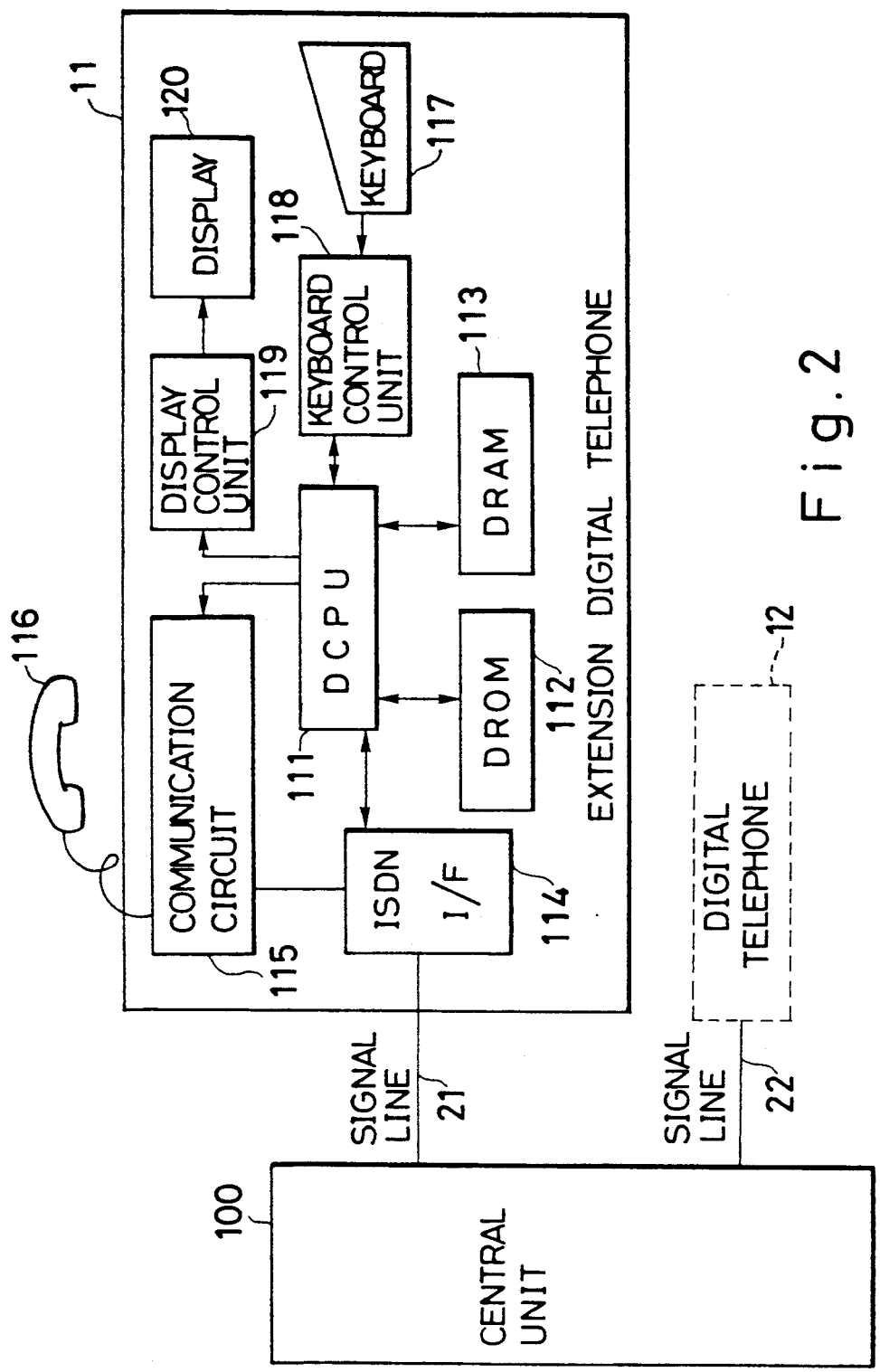
FIG. 2 is a detailed block diagram which illustrates the structure of an extension digital telephone according to this embodiment.

FIG. 2 is a detailed block diagram which illustrates the structure of the extension digital telephone according to this embodiment. Referring to FIG. 2, although an exclusive digital telephone 11 is subjected to the description, the digital telephone 12 has substantially the same structure.

Referring to this drawing, reference numeral 111 represents a DCPU for controlling the overall structure of this digital telephone in accordance with a program stored in a ROM 112. Reference numeral 112 represents the ROM for storing parameters or the like for use in the device according to this embodiment in addition to the above-described programs stored. Reference numeral 114 represents an ISDN interface (ISDN·I/F) with the extension digital trunk circuit 8. Reference numeral 115 represents a conversation circuit for converting a digital signal from the ISDN·I/F 114 into the corresponding analog signal so as to transmit the thus-obtained analog signal from the telephone receiver of a handset 116, and as well for converting an analog signal from the transmitter of the handset 116 into the corresponding digital signal so as to transmit the thus obtained digital signal to the ISDN·I/F 114. Reference numeral 116 represents the handset, 117 represents a keyboard comprising dial keys, control keys and the like, 118 represents a keyboard control unit for controlling the signal input from the keyboard 117, 120 represents a display, and 119 represents a display control unit for controlling the display realized by the display 120.

Figure 3:
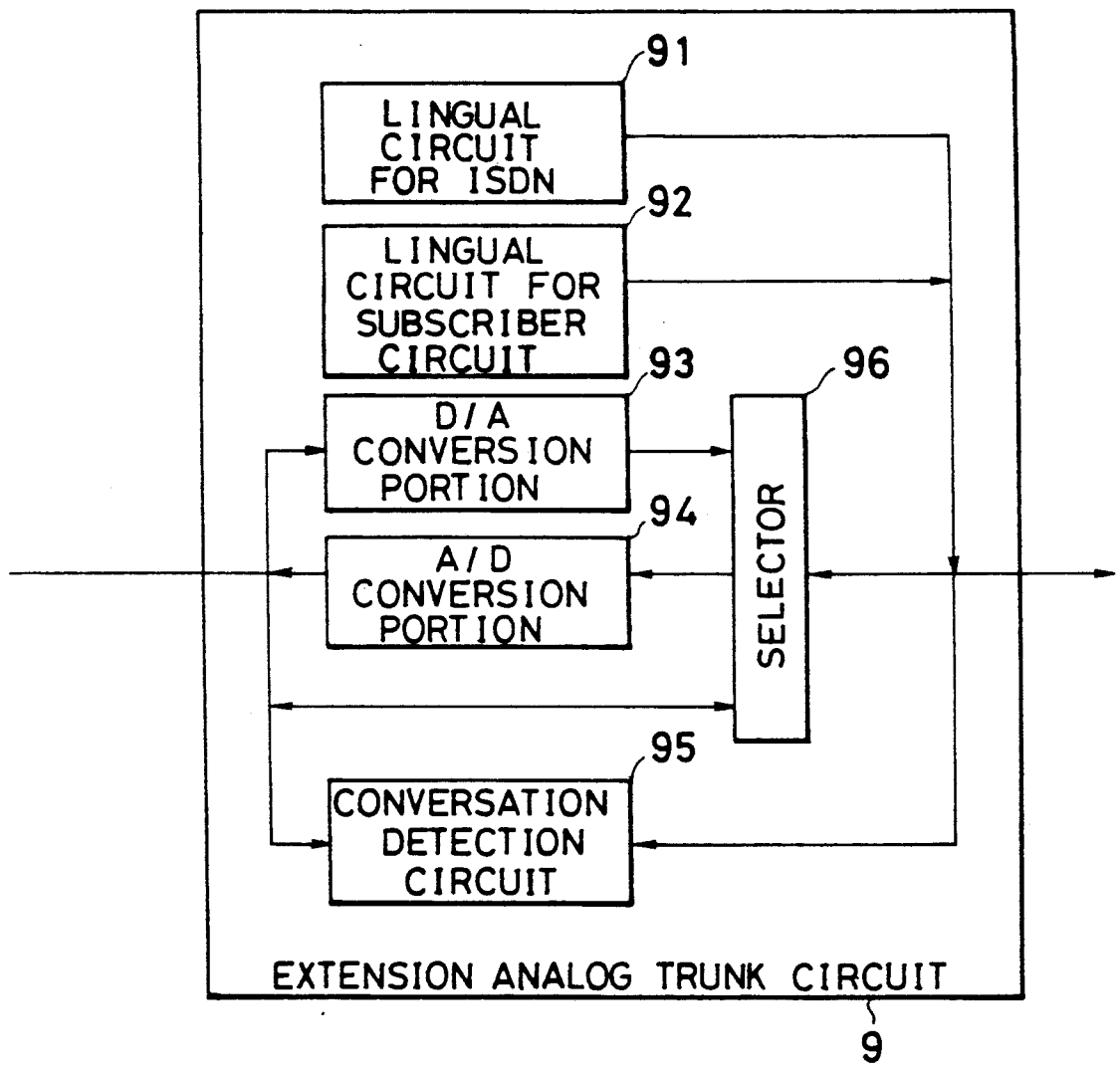
FIG. 3 is a partial and detailed block diagram which illustrates the structure of an extension analog trunk circuit according to this embodiment.

FIG. 3 is a partial and detailed block diagram which illustrates the structure of an extension analog trunk circuit. FIG. 3 is a view which illustrates the specific structure according to this embodiment and general components of the extension analog trunk circuit are omitted in part from the description.

Referring to FIG. 3, reference numeral 91 represents a lingual circuit for ISDN for transmitting a lingual signal for the ISDN which represents a fact that a call demand from the ISDN 300 to the analog telephone has reached. Reference numeral 92 represents a lingual circuit for the subscriber line for outputting a lingual signal for the subscriber representing the presence of a call from the subscriber network 200. It is arranged that the subscriber lingual signal and the lingual signal for the ISDN can be readily distinguished from each other. Reference numeral 93 represents a digital analog conversion portion (D/A conversion portion) for converting the digital signal from the ISDN circuit 32 into the corresponding analog signal when the extension analog trunk circuit 9 is connected to the ISDN line 32, and it transmits the thus-obtained analog signal to the signal line 23 via the selector 96. Reference numeral 94 represents an analog digital conversion portion (A/D conversion portion) for converting the analog signal transmitted from the analog telephone via the selector 96 into the corresponding digital signal when the extension analog trunk circuit 9 is connected to the ISDN line 32, and it transmits the thus-obtained digital signal to the conversion processing portion 4. Reference numeral 95 represents a conversation detection circuit for detecting the state of conversation such as demand of transmission of a call by way of OFF-HOOK of the handset of the analog telephone 13 or end of a conversation by way of ON-HOOK of the handset. Reference numeral 96 represents a selector for making the D/A conversion portion 93 and the A/D conversion portion 94 dispose between the signal line 23 and the conversion processing portion 4 when the extension analog telephone and the ISDN line are connected to each other, while it directly connects the signal line 23 and the conversion processing portion 4 when the extension analog telephone and the subscriber telephone line 31 are connected to each other.

Figure 4:
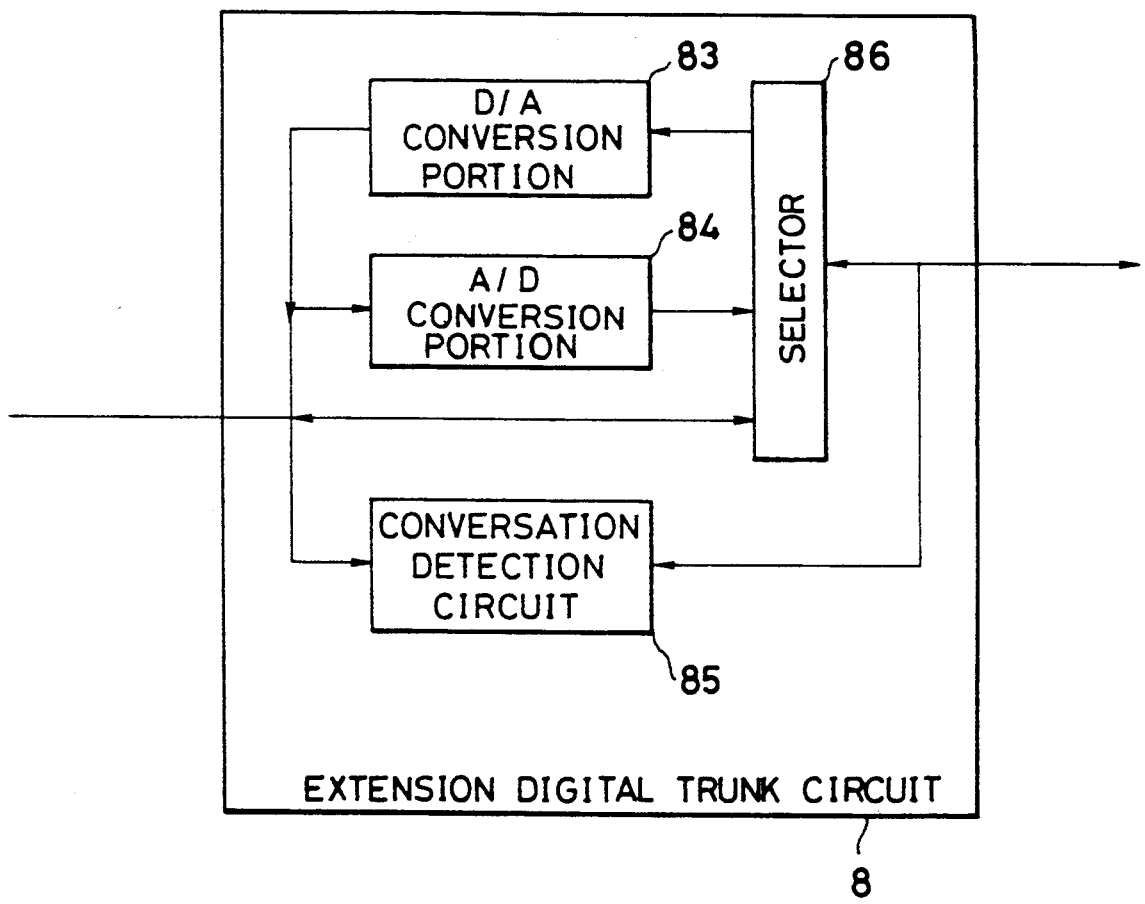
FIG. 4 is a partial and detailed block diagram which illustrates the structure of an extension digital trunk circuit according to this embodiment.

FIG. 4 is a partial and detailed block diagram which illustrates the structure of the extension digital trunk circuit according to this embodiment. FIG. 4 is a view which illustrates the specific structure according to this embodiment and general components of the extension digital trunk circuit are omitted in part from the description.

Referring to FIG. 4, reference numeral 84 represents an analog digital conversion portion (A/D conversion portion) for converting the analog signal from the subscriber telephone line 31 into the corresponding digital signal when the extension digital trunk circuit 8 is connected to the subscriber telephone line 31 so as to transmit the thus-obtained digital signal to the signal lines 21 and 22 via the selector 86. Reference numeral 83 represents a digital analog conversion portion (D/A conversion portion) for converting the digital signal transmitted from the digital telephone via the selector 86 so as to transmit the thus-obtained analog signal to the conversion processing portion 4 when the extension digital trunk signal 9 is connected to the subscriber telephone line 31. Reference numeral 85 represents a conversation detection circuit for detecting the state of conversation such as demand of transmission of a call by way of OFF-HOOK of the handset of the digital telephone or the input operation into the keyboard 117 or end of a conversation by way of ON-HOOK of the handset or the input operation into the keyboard 117. Reference numeral 86 represents a selector for making the D/A conversion portion 83 and the A/D conversion portion 84 dispose between the signal lines 21 and 22 and the conversion processing portion 4 when the extension digital telephone and the subscriber telephone line 31 are connected to each other so that the extension digital telephone and the subscriber telephone line 31 are enabled to be connected to each other, while it directly connects the signal lines 21 and 22 to the conversion processing portion 4 when the extension digital telephone and the ISDN line 32 are connected to each other.

Then, the communication controlling operation performed in the above-described structure according to this embodiment will be described with reference to flow charts shown in FIGS. 5A to 5F.

In step S1, an initialization processing is first performed in the input/output device 14 in such a manner that the assignments of ISDN line and the subscriber telephone line are determined, the extension number for the extension line to which the analog telephone 13 is connected is registered, and initialization information such as additional information such as the caller number to be added when a call transmitted from this analog telephone 13 is input to the ISDN line 32. The thus determined information is stored in the control table 5a in the memory 5.

Then, it is observed whether or not the receipt of a call through the connection line is present or whether or not a demand of transmitting a call from the extension terminal is present in the corresponding step S2 and step S3.

If a call receipt from the connection line is detected, and if the subscriber telephone line trunk circuit 2 or the ISDN trunk circuit 3 detects the transmission of a call or the receipt of a call, the flow advances from step S2 to step S5 in which it is determined whether or not the line which has detected the call receipt is the line from the ISDN line 32 (whether or not the ISDN trunk circuit 3 has detected it). If the received call is a call from the ISDN line 32 and the ISDN trunk circuit 3 detects the "demand of call receipt", the flow advances from step S5 to step S6 in which it is determined whether or not "responder sub-address" is included together with the received "caller number" and "caller sub-address" in the "call receipt demanding frame" which is defined in accordance with the ISDN communication standard. If it is detected that the "responder sub-address" is not included, the flow advances to step S7 in which it is notified to all of the connected telephones of a fact that a receipt demand from the ISDN line 32 is present. At this time, additional information is simultaneously transmitted to the digital telephones 11 and 12 so as to make the display of each of these telephones display the additional information. The thus-displayed additional information includes the "caller number" and the "caller sub-address" contained in the "demand of call receipt" from the caller.

The analog telephone 13 is made to transmit a lingual sound for the ISDN serving as the receipt signal representing a fact that a call from the ISDN line 32 has been received, this lingual sound being transmitted by starting the ISDN lingual circuit 91 in the extension analog trunk circuit 9, and the flow advances to step S15.

On the other hand, if the "responder sub-address" is contained in the received "call receipt demand", the flow advances from step S6 to step S8 in which it is determined whether the analog telephone 13 or the digital telephones 11 and 12 is assigned with the "responder sub-address". If the analog telephone 13 is not assigned (when the digital telephone is assigned), the flow advances to step S9 in which it is notified to only the digital telephone assigned with the "responder sub-address" of a fact that the call receipt demand from the ISDN line 32 is present. Simultaneously with this, the additional information is transmitted so as to be displayed by the display of the thus-assigned digital telephone.

Since the responder sub-address has been assigned at this time, the call receipt signal is not transmitted to the other extension telephones.

Furthermore, the additional information such as the "caller number" and the "caller sub-address" contained in the "call receipt demand" from the caller is transmitted to the input/output device 14 via the interface circuit 10 for the input/output device. Then, the flow advances to step S15. As a result, the thus transmitted information is displayed by the display of the input/output device 14. Simultaneously with this, the assignment of the telephone with the responder sub-address is displayed.

On the other hand, if it is detected in step S8 that the analog telephone 13 is assigned with the "responder sub-address", the flow advances to step S10 in which the ISDN circuit 91 in the extension analog trunk circuit 9 is started in order to transmit the call receipt signal to only the analog telephone 13 so that a lingual sound (call receipt signal) for ISDN is transmitted for the purpose of notifying a fact that there is a call receipt demand from the ISDN. At this time, since only the analog telephone has been assigned with the responder sub-address, no call receipt signal is transmitted to the other extension telephones. Then, the flow advances to step S11. As a result of the control conducted above, the responder with the analog telephone can recognize the fact that the received call is transmitted from the ISDN line simply by listening to the lingual sound. In step S11, it is determined whether or not additional information is contained in the "call receipt demand". If any additional information is not contained, the flow advances to step S15. If additional information is contained in the "call receipt demand", the flow advances to step S12 in which whether or not a display is provided for the subject analog telephone is detected. The fact that the provision or not of a display for the analog telephone has been determined in the initialization in step S1. Since no display is provided according to this embodiment, the flow advances to step S14.

However, a telephone provided with a display is connected in the structure, the flow advances to step S13 in which additional information such as "caller number", "caller sub-address", and the like contained in the "call receipt demand" from the caller is transmitted to the analog telephone 13 so as to be displayed on the display of this telephone. Then, the flow advances to step S15. In this case, for example, a digital control signal line for controlling display realized by the display is, as a signal line connected to the analog telephone, individually connected to this telephone so as to transmit display data to the display via this digital control signal line.

It is preferable that the control unit 1 transmits a call receipt signal to the extension digital telephone (the exclusive system telephone) 11 via the extension digital trunk circuit 8a when the analog telephone 13 is being used in a case where the conversion processing portion 4 intends to transmit a call to the extension analog telephone 13. In addition, it is preferable that the control unit 1 notifies the additional information transmitted by the caller or a fact that the response which is being conducted is a deputy response so that the display of the digital telephone 11 displays this fact, this state being notified to the responder for the purpose of make start of the conversation smooth.

The fact that the deputy response is conducted may be notified to the caller from the voice response processing portion 6 at this time. It needs, at this time, to select message information representing a deputy response from the response messages registered in the message registering portion 6a of the voice response processing portion 6 and to transmit the thus-selected message information to the caller side (to the ISDN line 32) via the conversion processing portion 4 and the ISDN trunk circuit 3.

On the other hand, if it is determined, in step S12, that no display is provided for the analog telephone, the flow advances to step S14 in which additional information such as "caller number", "caller sub-address", and the like contained in the "call receipt demand" from the caller is transmitted, via the interface circuit 10 to this input/output device 14 so as to be displayed by the display of this input/output device 14. Then, the flow advances to step S15. According to this embodiment, if the call is demanded to be received by an analog telephone, additional information in the call receipt demand from the ISDN is, as much as possible, displayed by this analog telephone, and the additional information contained in the call receipt demand can be displayed by using the input/output device 14 in the case where the additional information cannot be displayed by the analog telephone. As a result, since a specific call sound representing a fact that the subject call is transmitted from the ISDN is employed to be transmitted from the analog telephone, the fact that the call was made by the ISDN can be recognized, and as well the additional information contained in the call receipt demand made to the analog telephone can be confirmed by looking the display on the input/output device 10 so as to be responded properly. This display may, alternatively, be realized by means of a printing-out by a printer provided for the input/output device. In step S15, a response by way of OFF-HOOK of the handset of the connected extension telephone or the like is waited. If the response is detected, the flow advances to step S16 in which it is determined whether or not the responding telephone is the analog telephone 13. If it is determined that the analog telephone is responding and the OFF-HOOK of the analog telephone is detected by the conversation detection circuit 95 in the extension analog trunk circuit 9, the flow advances to step S17 in which the voice response processing portion 6 is started so as to notify the caller through the ISDN of a fact that the additional information notified by the caller has not reached the responder since the call is received by the analog telephone. As a result, conversation can be started smoothly.

In a case where the system is structured such that the additional information cannot be notified to the responder, a voice synthesizing circuit (analog-digital conversion circuit) or the like is provided for the voice response processing portion 6 or the extension analog trunk circuit 6 or the like so as to convert the contents of the additional information in the form of a digital signal into voice in the form of an analog signal and to transmit the thus-obtained voice to the analog telephone. As a result, the digital information such as the contents of the additional information is converted into the corresponding voice information so as to be notified to the responder directly.

Then, in step S18, the conversion processing portion 4 or the like is controlled and a communication line is established between the call receipt circuit and the response telephone, respectively so that a call communication is established between the caller and the responder. At this time, the selector 96 of the extension analog trunk circuit 9 is controlled so as to interpose the D/A conversion portion 93 and the A/D conversion portion 94 between the extension line and the conversion processing portion 4, and the analog signal from the extension telephone is transmitted to the ISDN trunk circuit 3 via the conversion processing portion 4 after being converted into the corresponding digital signal so as to be further transmitted to the ISDN line 32 and the ISDN 300. On the other hand, the digital signal from the ISDN line 32 is transmitted to the analog telephone after it has been converted into the corresponding analog signal.

The control unit 1 starts the telephone charge processing portion 7 in step S19 so that the telephone charge counting is started and make the input/output device 14 is made to display the telephone charge. The structure may be established such that this telephone charge processing is conducted in only a case of the communication with the public telephone network 200 and no telephone charge processing is conducted in a case of the communication with the ISDN 300.

In the next step S20, it is determined whether the conversation detection circuit 95 detects the line disconnecting demand due to the end of the conversation or the line disconnecting demand due to ON-HOOK. If no line disconnecting demand is detected and the conversation is intended to be continued, the flow returns to step S19 in which updating of the display of the telephone charge or the like is conducted.

If the line disconnecting demand is detected and as well the conversation is ended, the flow advances to step S21 in which the communication line established between the two lines which have been engaged is disconnected so that the two lines are restored. Then, the conversation history such as the current the other end of the line, conversation time, and the telephone charge or the like is registered in the engaged extension telephone region in the conversation history table 5b of the memory 5 at which the processings are ended, and the flow returns to step S2. At this time, the display of the input/output device 14 is restored to the time indication mode or the like which is arranged to be conducted before the receipt of the call.

On the other hand, if it is detected, in step S16, the digital telephone responds it, the flow advances to step S25 in which a communication line is established between the telephone to be allowed to respond and the ISDN line 32. In this case, since a digital signal communication is conducted in both cases, the selector 86 directly connects the conversion processing portion 4 and the extension line with the A/D or the D/A conversion portion bypassed. Then, in step S26, it is determined whether or not the line disconnecting demand has been transmitted from the extension line or the ISDN line 32 due to the end of the conversation. If no line disconnecting demand is transmitted, the engaged state is maintained, while if the line disconnecting demand is transmitted, the flow advances to step S21.

If it is detected that the call is not a call from the ISDN line 32 but it is the call from the subscriber telephone line 31, the flow advances to step S30. In step S30, a fact that a call from the subscriber telephone line 31 is present is notified to all of the connected telephones. At this time, the digital telephones 11 and 12 is made to display the fact that this call is the call from the subscriber telephone line 31, while the analog telephone 13 is arranged to make the subscriber line lingual circuit 92 of the extension analog trunk circuit 9 output a subscriber line lingual sound which represents the fact that this call is the call from the subscriber telephone line 31. Then, in step S31, the response by way of OFF-HOOK of the handset of the connected extension telephone is waited. If the response is detected, the flow advances to step S32 in which it is detected whether or not the responding telephone is the analog telephone 13. If the response is conducted by the analog telephone 13 and the conversation detection circuit 95 detects the OFF-HOOK or the like, the flow advances to step S33 in which the conversion processing portion 4 is so controlled that a communication line is established between the subscriber telephone line 31 and the responding analog telephone 13. At this time, the selector 96 of the extension analog trunk circuit 9 is simultaneously controlled so as to directly connect the extension line and the conversion processing portion 4 with the D/A conversion portion 93 and the A/D conversion portion 94 bypassed. Then, in the next step S34, the telephone charge processing portion is started so as to start counting the telephone charge and control is so conducted that the input/output device 14 displays the telephone charge.

Then, in step S35, it is determined by the conversation detection circuit 95 whether or not the ON-HOOK due to the end of the conversation or the disconnection of the line is present. If the above described fact is not detected and the conversation is intended to be continued, the flow returns to step S34 in which the telephone charge and the display and the like are updated.

If the conversation has been ended and the ON-HOOK is detected, the flow advances to step S36 in which the engaged two lines are restored. Then, the conversation history such as the current the other end of the line, conversation time, and the telephone charge or the like is registered in the engaged extension telephone region in the conversation history table 5b of the memory 5 at which the processings are ended, and the flow returns to step S2. At this time, the display of the input/output device 14 is restored to the time indication mode or the like which is arranged to be conducted before the receipt of the call.

On the other hand, if it is detected, in step S32, that the digital telephone responds it, the flow advances to step S40 in which a communication line is established between the responding telephone and the subscriber telephone line 31 by controlling the conversion processing portion 4. At this time, the analog-digital conversion processing or digital-analog conversion processing is conducted such that the selector 86 of the extension digital trunk circuit 8 is controlled so as to interpose the D/A conversion portion 83 and the A/D conversion portion 84 between the conversion processing portion 4 and the extension line, the digital communication information from the responding digital extension telephone is converted into analog communication information so as to be transmitted to the subscriber telephone line 31, or the analog communication information from the subscriber telephone line 31 is converted into the corresponding digital communication information so as to be transmitted to the digital extension telephone. Then the flow advances to step S34 in which the telephone charge processing portion 7 is started so as to make the input/output device 14 display the telephone charge. In this case, since the responding telephone is the digital telephone, the display of the telephone charge is conducted with the display thereof in addition to the display conducted by the display of the input/output device 14.

In step S35, it is observed that whether or not the opening of the subscriber telephone line 31 due to the end of the conversation is present or whether or not there is a demand of disconnection from the telephone is present.

If it is detected, in step S3, that the call transmitting demand is issued from the connected extension telephone, the flow advances from step S3 to step S50 in which it is detected whether or not it is the call transmitting demand to the ISDN line 32. The detection of the call transmitting demand to the ISDN line 32 may be conducted such that a control is so conducted that control information for specifying the other end of the line which has been previously determined is transmitted and with which the line to be called is determined.

If the call demand is not made to the ISDN line 32, but it is the call to the subscriber telephone line 31, the flow advances to step S51 in which a fact whether or not a free line is present is detected, that is, whether or not the subscribing telephone line is being engaged is determined. If there is no free line, that is, if the line is engaged, the flow advances to step S52 in which a fact that the line is engaged is notified to the telephone which is demanding the call by means of a sound representing a fact that the line is engaged or a voice response from the voice response portion 6. Then, the flow returns to step S2. If there is a free line, that is, if the line is not engaged, the flow advances to step S55 in which this free line is caught. In step S56, it is detected whether or not the call demand is issued from the analog telephone 13. If the call demand is issued from the analog telephone 13, the flow advances to step S57 in which the conversion processing portion 4 is so controlled as to establish a communication line between the analog telephone connection line (signal line 23) and the thus-caught subscriber telephone line. At this time, the selector 96 of the extension analog trunk circuit 9 directly connects the conversion processing portion 4 and the extension line by bypassing the D/A conversion portion 93 and the A/D conversion portion 94. As a result, the telephone number at the other end of the line from this analog telephone is, from this time, transmitted to the public telephone network 200 connected to the subscriber telephone line 31 so that the requested telephone to be connected is called up. Then, in the next step S58, the input/output device 14 is brought into a mode in which the telephone charge is displayed. Therefore, when the other end of the line make a response, the telephone charge processing portion 7 is started so as to count the telephone charge and the display of the input/output device 14 is made to display the thus-counted telephone charge together with the type of the call transmitting telephone.

In step S59, if it is detected that the conversation has been ended and the conversation detection circuit 95 detects the disconnection of the line due to ON-HOOK or the like, the flow advances to step S60 in which the two engaged lines are opened so as to be restored. Then, the conversation history such as the current the other end of the line, conversation time, and the telephone charge or the like is registered in the engaged extension telephone region in the conversation history table 5b of the memory 5, and the flow returns to step S2.

On the other hand, if it is detected that the telephone demanding to transmit a call is not the analog telephone 13, but if it is the digital telephone and this demand is made to a specific the other end of the line, the flow advances to step S61 in which the fact that the line has been caught is notified to the telephone which is issuing a demand to transmit a call. Then, in step S62, the telephone number data of the other end of the line which is to be transmitted next is converted into the corresponding telephone number signal so as to be transmitted to the caught subscriber telephone line 31. In this case, the selector 86 of the extension digital trunk circuit 8 is so controlled that the D/A conversion portion 83 and the A/D conversion portion 84 are interposed between the conversion processing portion 4 and the extension line. Then, the flow advances to step S57. The control is so conducted that the display of the telephone charge is displayed not only on the display of the input/output device 14 but also on the display of the digital telephone which has issued a demand to transmit the call so as to shorten the conversation time period.

Thus, the control unit 1 makes the telephone charge processing portion 7 start the telephone charge processing immediately after the other end of the line has responded even if the call is transmitted from any extension telephone so far as the call is transmitted to the subscriber telephone line 31, so that the telephone charge is observed in terms of the distance from the other end of the line or the conversation time period. A signal to update the display is transmitted to each of the devices via the conversion processing portion 4 whenever the telephone charge is made increment so that the displays of the digital telephones 11 and 12 and the display of the input/output device 14 display the charge when the call is transmitted from the digital telephones 11 and 12, while, when the call is transmitted from the analog telephone 13, the display of the input/output device 14 displays this charge.

Each of the devices to which the telephone charge has been notified displays the current telephone charge in response to the signal for updating the display so as to warn the lengthened conversation time. The thus-displayed, observed, and calculated telephone charge is, similarly to the above-processing, totalized after the conversation has been ended so that the thus-totalized telephone charge is stored in the extension telephone region which is subjected to the conversation in the conversation history table 5a in the memory 5.

As a result, when a command is made to read the conversation history by the input/output device 14, the contents of this conversation history table 5b can be read out so as to be displayed, and also the telephone charge can be displayed simultaneously.

On the other hand, if it is detected, in step S50, that the demand to transmit a call is made to the ISDN line 32, the flow advances from step S50 to Step S65 in which it is detected whether or not there is a free line in the ISDN line 32. If it is detected that there is no free line, the flow advances to step S66 in which a sound representing the fact that the line is engaged is transmitted to the telephone which is demanding to transmit a call or the corresponding sound response is transmitted to the same from the sound response processing portion 6 so that the fact that the ISDN line 32 cannot be caught is notified, and the flow returns to step S2.

If it is detected, in step S65, that the line is not engaged, that is, there is a free line, the flow advances to step S67 in which the free line is caught. Then, the fact that the line has been caught is notified to the telephone which is demanding to transmit a call. This operation may be conducted by means of a voice response from the voice response processing portion 6 (in a case of the analog telephone), or by means of, if possible, a display on the display of the telephone which is demanding to transmit a call (in a case of the digital telephone). Then, in step S68, it is detected whether or not the demand to transmit a call is made from the analog telephone. If the demand to transmit a call is not made by the analog telephone 13, but it is made by the digital telephone, the flow advances to step S69. In this case, the selector 86 of the extension digital trunk circuit 8 is so controlled that the D/A conversion portion 83 and the A/D conversion portion 84 are bypassed and the conversion processing portion 4 and the extension line are directly connected to each other. The control unit 1 receives the message information, and the additional information such as the telephone number of the telephone which is issuing a demand to transmit a call, or their components transmitted from the telephone which is demanding to transmit a call so as to transmit the thus-received information to the ISDN line 32. If necessary, the control unit 1 edits the thus-received information so as to generate "a call transmission command", and the flow advances to step S72.

On the other hand, if it is detected, in step S68, the demand to transmit a call is made by the analog telephone 13 and the demand to transmit a call is made due to the fact that the subscriber telephone line 31 is being engaged or the transmission of the call is destined to a specific ISDN, the flow advances to step S70 in which the selector 96 of the extension analog trunk circuit 9 is so controlled that the D/A conversion portion 93 and the A/D conversion portion 94 are interposed between the extension line and the conversion processing portion 4. As a result, the digital signal transmitted from the ISDN line 32 via the conversion processing portion 4 is converted into the corresponding analog signal so as to be transmitted to the analog telephone. On the other hand, the analog signal from the analog telephone is converted into the corresponding digital signal so as to be transmitted to the ISDN trunk circuit 3 via the conversion processing portion 4 before being transmitted to the ISDN line 32 and the ISDN 300. Then, information about the other end of the line of the telephone which is issuing a demand to transmit a call in the form of the telephone number signal (a dial pulse signal, a DTMF signal, or the like) to be transmitted next from the analog telephone 13 is received so as to be converted into the corresponding digital data signal. As a result, the thus-obtained digital data signal is temporarily stored in a predetermine region of the memory 5. At this time, it is preferable that the control is so conducted that if any information about the other end of the line is not transmitted after a predetermined time period has been elapsed, this demand to transmit a call is made invalid, causing the line to be restored and the flow to return to step S2.

Then, in step S71, the additional information which has been previously registered in step S1 is edited with the received telephone number of the other end of the line so as to generate "a call transmission command". Then, the flow advances to step S72. That is, when a call is made outside via the ISDN line 32, data (subaddress information or the like) necessary to conducting an additional information service supported by the ISDN is, in prior to the call transmission demanding, transmitted from the input/output device 14 to the control unit 1 via the interface circuit 10 for the input/output device 14 and the conversion processing portion 4. In the control unit 1, the thus-transmitted data for the additional information service is stored in a predetermined region in the memory 5 thereof so as to add the additional information stored in this memory 5 to the "call transmission command" when the analog telephone 13 calls the ISDN line 32.

In step S72, the thus-generated "call transmission command" is transmitted to the caught ISDN line 32. Then, in the next step S73, the response to this "call transmission command" is waited. When the response to the other end of the line is received, the flow advances to step S73 in which a communication line is established between the telephone which is issuing the demand to transmit a call and the caught line so that the conversation is enabled.

In the next step S75, the telephone charge processing portion 7 is started so as to start the telephone charge counting and to make the input/output device 14 display the telephone charge. At this time, if the demand to transmit a call is made by the digital telephone, the telephone charge is also displayed on the display of this telephone.

Then, in the next step S76, it is detected whether or not there is a demand to disconnect the line due to the end of the conversation from the conversation detection circuit or there is a demand to disconnect the line by ON-HOOK. If the conversation is intended to be continued, the flow returns to step S75 in which the display of the telephone charge is updated and so on.

If it is detected that there is a demand to disconnect the line due to the end of the conversation, the flow advances to step S77 in which the communication line between the two lines which have been engaged with each other is disconnected so that the two lines are restored. Then, the conversation history such as the current the other end of the line, conversation time, and the telephone charge or the like is registered in the engaged extension telephone region in the conversation history table 5b of the memory 5 at which the processings are ended, and the flow returns to step S2. At this time, the display of the input/output device 14 is restored to the time indication mode or the like which is arranged to be conducted before the receipt of the call.

As described above and according to this embodiment, both the analog telephone and the digital telephone are able to transmit a call to the ISDN line and the subscriber line (public telephone network).

In addition, both the analog telephone and the digital telephone are capable of responding to a call (a demand of call receipt) from the ISDN line and the subscriber line (public telephone network).

As described above and according to the present invention, the call from the ISDN can be responded by the analog signal I/O terminal and digital signal I/O terminal connected to the extension line.

Consequently, the system according to the present invention can be connected to the conventional analog signal I/O terminals, causing the resource to be utilized effectively, and the additional service from the ISDN can be effectively utilized.

What is claimed is:

1. A telephone system connected to at least an ISDN and a public telephone network capable of accommodating an extension line connected to an analog signal I/O terminal and an extension line connected to a digital signal I/O terminal, said telephone system comprising:

D/A conversion means capable of converting digital communication information into a corresponding analog communication information;

A/D conversion means capable of converting analog communication information into a corresponding digital communication information; and communication line control means capable of controlling a communication line arranged between a line connected to said ISDN, a line connected to said public telephone network, and said accommodated extension lines, wherein a call made from said ISDN and said public telephone network can be responded to by both said analog signal I/O terminal and said digital signal I/O terminal which are connected to said extension lines, through use of said D/A conversion means and A/D conversion means.

2. A telephone system according to claim 1, wherein said D/A conversion means comprises first and second D/A converters and said A/D conversion means comprises first and second A/D converters and wherein said first D/A converter and said first A/D converter are actuated only when a communication between said analog signal I/O terminal and said ISDN is established, said first D/A converter converts said digital communication information from said ISDN into said corresponding analog communication information, and said first A/D converter converts said analog communication information from said analog signal I/O terminal into said corresponding digital communication information whereby a call from said ISDN can be responded to by the analog signal I/O terminal connected to said extension lines.

3. A telephone system according to claim 1 further comprising notifying means for notifying a caller of a fact that said call is responded by said analog signal I/O terminal and also notifying said analog signal I/O terminal which is responding to said call of a fact that the subject call is made by said ISDN when a call demand from said ISDN is responded by said analog signal I/O terminal.

4. A telephone system according to claim 3, wherein said notifying means further notifies additional service information obtainable from said ISDN to extension lines connected to said digital signal I/O terminal other than said responding terminal, and the thus-notified additional service information is able to be transmitted and stored at a digital I/O terminal connected to said extension line.

5. A telephone system according to claim 1 further comprising collection means for collecting a communication history and storage means for storing said communication history collected by said collection means.

6. A telephone system according to claim 1 further comprising means for at least outputting a call demand to a connected extension line which is specified by additional service information obtainable from said ISDN when a call demand is further made by said ISDN.

7. A telephone system connected to public telephone network and an ISDN capable of accommodating an extension line connected to an analog signal I/O terminal and an extension line connected to a digital signal I/O terminal, said telephone system comprising:
   first and second D/A conversion means capable of converting digital communication information into a corresponding analog communication information;
   first and second A/D conversion means capable of converting analog communication information into a corresponding digital communication information; and
   communication line control means capable of controlling a communication line arranged between a line connected to said ISDN, a line connected to said public telephone network, and said accommodated extension lines,
   wherein a call made from said public telephone network and ISDN can be responded to by both said analog signal I/O terminal and said digital signal I/O terminal which are connected to said extension lines.

8. A telephone system according to claim 7, wherein when said analog signal I/O terminal communicates with said ISDN, said digital communication information from said ISDN is converted into a corresponding analog communication information by said first D/A conversion means so as to be transmitted to said analog signal I/O terminal, while said analog communication information from said analog signal I/O terminal is converted into a corresponding digital communication information by said first A/D conversion means, and when said digital signal I/O terminal communicates with said public telephone network, said analog communication information from said public telephone network is converted into a corresponding digital communication information by said second A/D conversion means so as to be transmitted to said digital signal I/O terminal, while said digital communication information from said digital signal I/O terminal is converted into a corresponding analog communication information by said second D/A conversion means so as to be transmitted to said public telephone network.

9. A telephone system according to claim 7 further comprising charging means for performing a predetermined charging processing when a call from said public telephone network is responded.

10. A telephone system according to claim 7 further comprising notifying means for notifying a caller of a fact that said call is responded by said analog signal I/O terminal and also notifying said analog signal I/O terminal which is responding to said call that the subject call is made by said ISDN when a call demand from said ISDN is responded by said analog signal I/O terminal.

11. A telephone system according to claim 10, wherein said notifying means further notifies additional service information obtainable from said ISDN to extension lines connected to said digital signal I/O terminal other than said terminal which is responding to said call, and the thus-notified additional service information is able to be transmitted and stored at a digital I/O terminal connected to said extension line.

12. A telephone system according to claim 7 further comprising collection means for collecting a communication history and storage means for storing said communication history collected by said collection means.

13. A telephone system according to claim 7 further comprising means for at least outputting a call demand to a connected extension line which is specified by additional service information obtainable from said ISDN when a call demand is further made by said ISDN.

14. A telephone system connected to an ISDN and a public telephone network capable of accommodating an extension line connected to an analog signal I/O terminal, said telephone system comprising:
   first connecting means capable of connecting said ISDN and said analog signal I/O terminal through D/A and A/D converters;
   second connecting means capable of connecting said public telephone network with said analog signal I/O terminal by bypassing said D/A and A/d converters; and
   actuation means capable of actuating said analog signal I/O terminal to give a first ring when a call from said ISDN is received, and a second ring, which is different in sound from the first ring, when a call from said public telephone network is received.

15. A telephone system according to claim 14, wherein said telephone system accommodates an extension line connected to an digital signal I/O terminal, and said digital signal I/O terminal comprises indicating means capable of indicating a signal received from an ISDN or a PSTN, while distinguishing between them.

16. A telephone system connected to an ISDN and a public telephone network capable of accommodating an extension line connected to an analog signal I/O terminal and an extension line connected to a digital signal I/O terminal, said telephone system comprising:

D/A conversion means capable of converting digital communication information into a corresponding analog communication information;

A/D conversion means capable of converting analog communication information into a corresponding digital communication information; and communication line control means capable of controlling a communication line arranged between a line connected to said ISDN, a line connected to said public telephone network and said accommodated extension lines, wherein said communication line control means controls calls made from said analog signal I/O terminal to said ISDN and said public telephone network, and calls made from said digital signal I/O terminal to said ISDN and said public telephone network.

* * * * *

UNITED STATES PATENT AND TRADEMARK OFFICE
CERTIFICATE OF CORRECTION

PATENT NO. : 5,067,125
DATED : November 19, 1991
INVENTOR(S) : SHINJI TSUCHIDA            Page 1 of 5

It is certified that error appears in the above-identified patent and that said Letters Patent is hereby corrected as shown below:

AT [57] ABSTRACT

Line 6, "A/D" should read --D/A--.

IN THE DRAWINGS:
SHEET 1 OF 10

FIG. 1, "NET WORK" should read --NETWORK-- and 'RIGISTERING" should read --REGISTERING--.

SHEET 5 OF 10

FIG. 5A, "NOTIEY" should read --NOTIFY--.

SHEET 6 OF 10

FIG. 5B, "NOTIEIED" should read --NOTIFIED--.

COLUMN 1

Line 16, "been" should be deleted.
    Line 32, "above described" should read --above-described--.
    Line 51, "responded" should read --responded to--.
    Line 55, "responded" should read --responded to--.

COLUMN 2

Line 17, "responded." should read --responded to.--.
    Line 35, "responded" should read --responded to--.
    Line 64, "drawing." should read --drawings.--.

UNITED STATES PATENT AND TRADEMARK OFFICE
CERTIFICATE OF CORRECTION

PATENT NO. : 5,067,125
DATED : November 19, 1991
INVENTOR(S) : SHINJI TSUCHIDA

It is certified that error appears in the above-identified patent and that said Letters Patent is hereby corrected as shown below:

COLUMN 3

Line 29, "FIG. 5A" should read --FIGS. 5A--.
Line 49, "phone" should read --phones--.

COLUMN 4

Line 22, "thus ob-" should read --thus-ob- --.
Line 38, "a fact" should be deleted.

COLUMN 5

Line 59, "thus determined" should read
--thus-determined--.

COLUMN 6

Line 16, "At" should read --¶ At--.
Line 64, "a fact" should be deleted.

COLUMN 7

Line 4, "In" should read --¶ In--.
Line 17, "the" (2nd occurrence) should read --and the--.
Line 37, "a fact" should be deleted.
Line 40, "make" should read --making the--.
Line 60, "According" should read --¶ According--.

UNITED STATES PATENT AND TRADEMARK OFFICE
CERTIFICATE OF CORRECTION

PATENT NO. : 5,067,125
DATED : November 19, 1991
INVENTOR(S) : SHINJI TSUCHIDA

It is certified that error appears in the above-identified patent and that said Letters Patent is hereby corrected as shown below:

COLUMN 8

Line 1, "a fact" should be deleted.
Line 6, "looking" should read --looking at--.
Line 8, "sponded" should read --sponded to--.
Line 10, "In" should read --¶ In--.
Line 31, "circuit 6" should read --circuit 9--.
Line 59, "make" should be deleted.
Line 62, "in only" should read --only in--.

COLUMN 9

Line 11, "current the" should be deleted.
Line 21, "responds" should read --responds to--.
Line 40, "is" should read --are--.

COLUMN 10

Line 4, "above described" should read
       --above-described--.
Line 11, "current the" should be deleted.
Line 21, "responds" should read --responds to--.
Line 50, "there is" should be deleted.
Line 64, "a fact" should be deleted.

COLUMN 11

Line 26, "make" should read --makes--.
Line 37, "current the" should be deleted.
Line 45, "a specific" should read --specifically--.

UNITED STATES PATENT AND TRADEMARK OFFICE
CERTIFICATE OF CORRECTION

PATENT NO. : 5,067,125
DATED : November 19, 1991
INVENTOR(S) : SHINJI TSUCHIDA

Page 4 of 5

It is certified that error appears in the above-identified patent and that said Letters Patent is hereby corrected as shown below:

COLUMN 12

Line 5, "increment" should read --incremental--.
Line 15, "warn" should read --warn of--.

COLUMN 13

Line 27, "predetermine" should read --predetermined--.

COLUMN 14

Line 4, "there" should read --if there--.
Line 14, "current the" should be deleted.
Line 31, "responded" should read --responded to--.

COLUMN 15

Line 13, "responded" should read --responded to--.
Line 17, "responded" should read --responded to--.
Line 36, "public" should read --a public--.

UNITED STATES PATENT AND TRADEMARK OFFICE
CERTIFICATE OF CORRECTION

PATENT NO. : 5,067,125

DATED : November 19, 1991

INVENTOR(S) : SHINJI TSUCHIDA

It is certified that error appears in the above-identified patent and that said Letters Patent is hereby corrected as shown below:

COLUMN 16

Line 15, "responded." should read --responded to.--.
Line 18, "responded" should read --responded to--.
Line 22, "responded" should read --responded to--.
Line 50, "A/d" should read --A/D--.
Line 60, "an" should read --a--.

Signed and Sealed this

Ninth Day of November, 1993

BRUCE LEHMAN

Attest:

Attesting Officer

Commissioner of Patents and Trademarks